United States Patent [19]
Minowa et al.

[11] Patent Number: 5,999,873
[45] Date of Patent: Dec. 7, 1999

[54] ENGINE POWERTRAIN CONTROL DEVICE AND METHOD FOR A VEHICLE

[75] Inventors: Toshimichi Minowa, Mito; Kenichirou Kurata, Hitachinaka; Tatsuya Ochi; Yoshiyuki Yoshida, both of Hitachi, all of Japan

[73] Assignee: Hitachi, Ltd., Tokyo, Japan

[21] Appl. No.: 08/724,672

[22] Filed: Oct. 1, 1996

[30] Foreign Application Priority Data

Oct. 6, 1995 [JP] Japan ...................................... 7-259746

[51] Int. Cl.⁶ ................................................... F16H 59/00
[52] U.S. Cl. .............................. 701/51; 701/55; 477/109; 477/110
[58] Field of Search ............................... 775/125; 477/61, 477/154, 155, 109, 110; 74/731.1, 733.1; 701/55, 56, 51

[56] References Cited

U.S. PATENT DOCUMENTS 5,613,920  3/1997  Ono et al. .............................. 477/109

Primary Examiner—William A. Cuchlinski, Jr.
Assistant Examiner—Arthur Donnelly
Attorney, Agent, or Firm—Evenson, McKeown, Edwards & Lenahan, P.L.L.C.

[57] ABSTRACT

An engine powertrain control device is configured to reduce data amounts of characteristics of a torque converter and realize torque estimation with high accuracy. A device detects or computes rotating speeds of input and output shafts of the torque converter. A device computes a ratio (speed ratio) between the rotating speed of the input shaft and the rotating speed of the output shaft of the torque converter. A device stores data of a pump capacity coefficient and torque ratio product of the torque converter and computes a value of the product corresponding to a value of the speed ratio computed above, and a device is provided for computing an output shaft torque of the torque converter by using the value of the computed product.

16 Claims, 7 Drawing Sheets

ENGINE POWERTRAIN CONTROL DEVICE AND METHOD FOR A VEHICLE

BACKGROUND AND SUMMARY OF THE INVENTION

The present invention relates to an engine powertrain control device in which torque is estimated by computation and to a control method for a vehicle having an engine powertrain consisting of an engine and an automatic transmission.

An engine powertrain is controlled by obtaining an output shaft torque of a torque converter of an automatic transmission and reducing fluctuations in the output shaft torque, thereby reducing a shift shock upon gear shifting.

As a known method of obtaining the output shaft torque of the torque converter, the torque is directly detected by of a torque sensor or estimated from other information by computation.

A torque estimating method is described in Japanese Patent Laid-open No. Hei 4-8961, for example, wherein the output shaft torque of the torque converter is estimated by using rotating speeds of input and output shafts of the torque converter and characteristics of the torque converter. The torque converter characteristics are a pump capacity coefficient and a torque ratio. Data of the pump capacity coefficient and data of the torque ratio are separately stored in the form of data table in a memory such as a ROM (Read-Only Memory) provided in a control device, as functions of a speed ratio which is a ratio between the rotating speeds of the input and output shafts of the torque converter. In performing the computation of the output shaft torque of the torque converter, the separate pieces of stored data are retrieved to be used.

In the prior art mentioned above, the data of the pump capacity coefficient and the data of the torque ratio are separately stored in the memory. Accordingly, the capacity of the memory must be enlarged. Further, each piece of data is stored as discrete values in the data table, so that interpolation between adjacent values is required. To reduce an error due to the interpolation, the space between the adjacent values must be reduced to increase the amount of the data, causing a further increase in the memory capacity.

As an alternative method, it is considered to store the data in the form of a functional expression rather than in the form of the data table. In the case of approximating actual values by using the functional expression, a high-order functional expression must be used in order to avoid large differences between calculated values by the functional expression and the actual values. However, it is difficult to find out an optimum functional expression that can make the calculated values coincide well with the actual values.

It is accordingly an object of the present invention to provide an engine powertrain control device and control method which can reduce data amounts of characteristics of a torque converter to be used for estimation of the output shaft torque of the torque converter.

According to the present invention, there is provided an engine powertrain control device comprising apparatus for detecting or computing rotating speeds of input and output shafts of a torque converter, apparatus for computing a speed ratio as a ratio between the rotating speed of the input shaft and the rotating speed of the output shaft of the torque converter obtained above, a memory for storing data of a pump capacity coefficient and a torque ratio product, c×t, obtained by multiplying a pump capacity coefficient c and a torque ratio t of the torque converter and for retrieving or computing a value of the product, c×t, corresponding to a value of the speed ratio computed above, and apparatus for computing an output shaft torque of the torque converter by using the value of the product, c×t, obtained above.

The rotating speeds of the input and output shafts of the torque converter are detected by mounting rotating speed sensors near the input and output shafts to directly detect the rotating speeds with the rotating speed sensors. Alternatively, the rotating speeds of the input and output shafts are computed by using any sensors other than the rotating speed sensors. The speed ratio computing apparatus computes a speed ratio as a ratio between the rotating speeds of the input and output shafts of the torque converter obtained above. The storing and computing apparatus storing data of a pump capacity coefficient and torque ratio product, c×t, retrieves a value of the product, c×t, corresponding to a value of the speed ratio obtained above. The torque converter output shaft torque computing apparatus computes a torque converter output shaft torque by using the value of the product, c×t, obtained above and the torque converter input shaft rotating speed obtained above. As described above, the storing and computing apparatus stores data of the pump capacity coefficient and torque ratio product, c×t, rather than separately storing data of a pump capacity c and data of a torque ratio t which are functions of the speed ratio. Accordingly, a memory capacity can be reduced to half. When in the past a value of the stored data is obtained by interpolation so that the data of the pump capacity coefficient c and the data of the torque ratio t are separately stored, an error occurred due to interpolation for each data. Accordingly, in computing the product, c×t, an even larger error occurred because of multiplication of the two interpolated values each having the initial error. To the contrary, according to the present invention, interpolation is made by using the data of the product, c×t, previously stored, so that the error due to the interpolation can be reduced over that in the prior art, thereby allowing torque estimation with high accuracy.

BRIEF DESCRIPTION OF THE DRAWINGS

These and other objects, features and advantages of the present invention will become more readily apparent from the following detailed description of the drawings wherein.

DETAILED DESCRIPTION OF THE PREFERRED EMBODIMENTS

Figure 1:
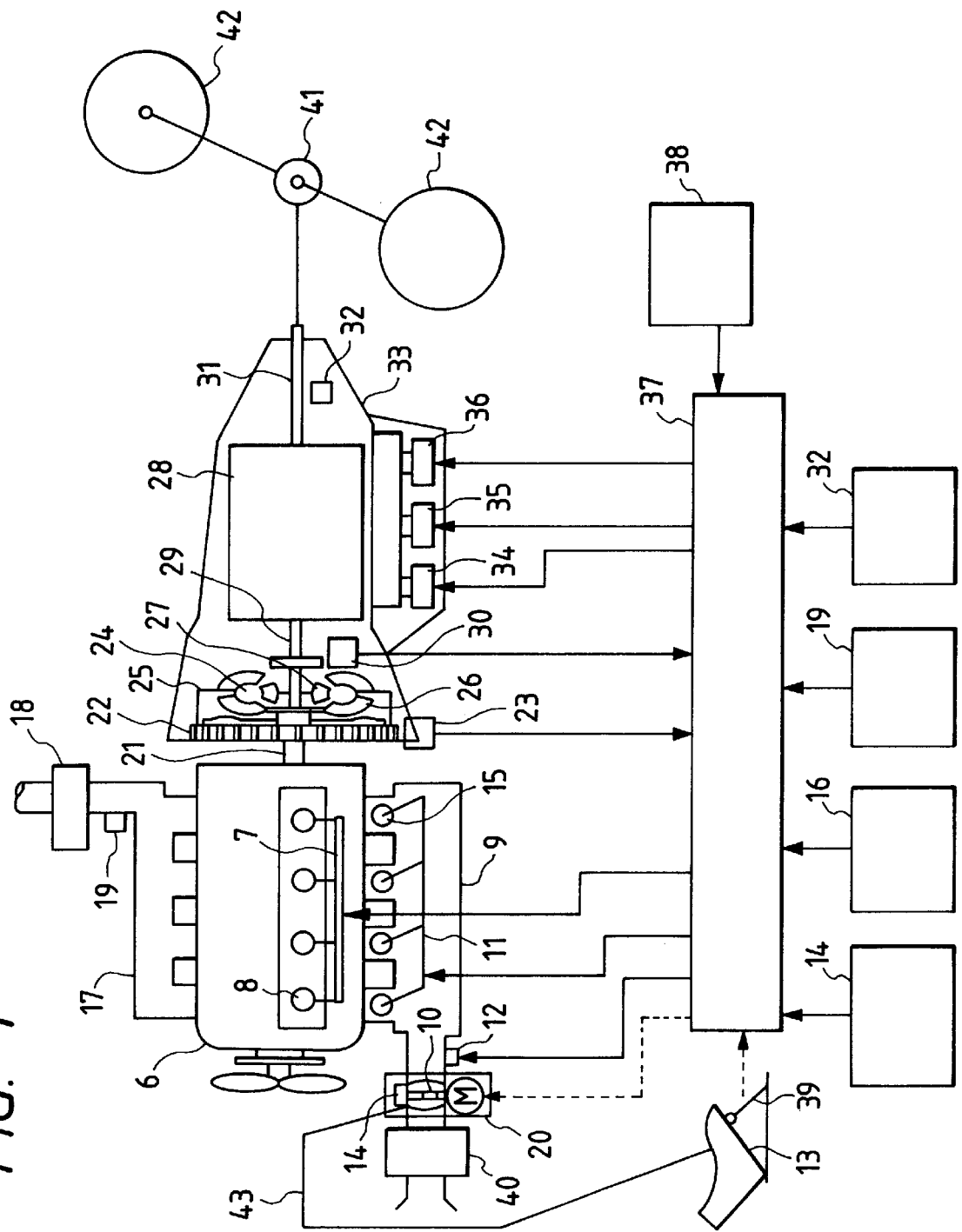
FIG. 1 is a schematic illustration of a system configuration of an engine powertrain in accordance with the present invention.

As shown in FIG. 1, an engine 6 is connected through a crankshaft 21 to an automatic transmission 33. In this preferred embodiment, the engine 6 is an inline 4-cylinder gasoline engine. The engine 6 is provided with an ignition device 7. The ignition device 7 has four ignition plugs 8 respectively corresponding to the four cylinders of the engine 6. An intake pipe 9 for taking the air into the cylinders of the engine 6 is provided with an air cleaner 40, a throttle valve 10 for regulating an air flow in the intake pipe 9, a fuel injection device 11 having four fuel injection valves 15 for respectively injecting fuel into the four cylinders of the engine 6, and an ISC (Idle Speed Control) valve 12 for controlling an air flow at idling. The throttle valve 10 is connected through a wire 43 to an accelerator pedal 13, so that the throttle valve 10 is operated by operating the accelerator pedal 13.

Alternatively, the system may employ an electronic control throttle 20 capable of controlling an air flow independently of an amount of operation of the accelerator pedal 13. The throttle valve 10 is provided with a throttle opening sensor 14. An exhaust pipe 17 for leading an exhaust gas from the engine 6 to the atmosphere is provided with a catalyst 18 for purifying the exhaust gas and an oxygen sensor (air-fuel ratio sensor) 19. A flywheel 22 is mounted on the crankshaft 21 of the engine 6. The flywheel 22 is provided with a rotating speed sensor 23 for detecting a rotating speed of the crankshaft 21, that is, a rotating speed of a torque converter input shaft. The flywheel 22 is directly connected to a pump 25 of a torque converter 24.

The automatic transmission 33 is composed of the torque converter 24 and a gear shifting mechanism 28. The torque converter 24 is composed of the pump 25, a turbine 26, and a stator 27. A torque converter output shaft 29 connected to the turbine 27 is directly connected to the gear shifting mechanism 28. A rotating speed sensor 30 is mounted near the torque converter output shaft 29 to detect a rotating speed of the output shaft 29. A rotating speed sensor 32 is also mounted near a transmission output shaft 31. With the rotating speed sensor 32, a rotating speed of drive wheels 42, that is, a vehicle speed No, can be obtained in consideration of a reduction ratio of a differential gear 41. The automatic transmission 33 is provided with solenoids 34, 35, and 36 for controlling clutch engagement oil pressures in the gear shifting mechanism 28.

A control unit 37 inputs signals from the throttle opening sensor 14, a water temperature sensor 16, the oxygen sensor 19, the rotating speed sensors 23, 30, and 32, and an automatic transmission oil temperature sensor 38, then computes control amounts for the engine powertrain, and outputs drive signals to actuators for the ISC valve 12, the fuel injection device 11, the ignition device 7, and the solenoids 34, 35, and 36. If the electronic control throttle 20 is used, the control unit 37 further inputs a signal from an operation amount sensor 39 for the accelerator pedal 13, and outputs a drive signal to the electronic control throttle 20. Although not shown, the water temperature sensor 16 is mounted in a known manner on the engine 6 to detect temperatures of a cooling water for cooling the engine 6. Further, although not shown, the automatic transmission oil temperature sensor 38 is also mounted in a known manner on the automatic transmission 33 to detect temperatures of an oil in the automatic transmission 33.

Figure 2:
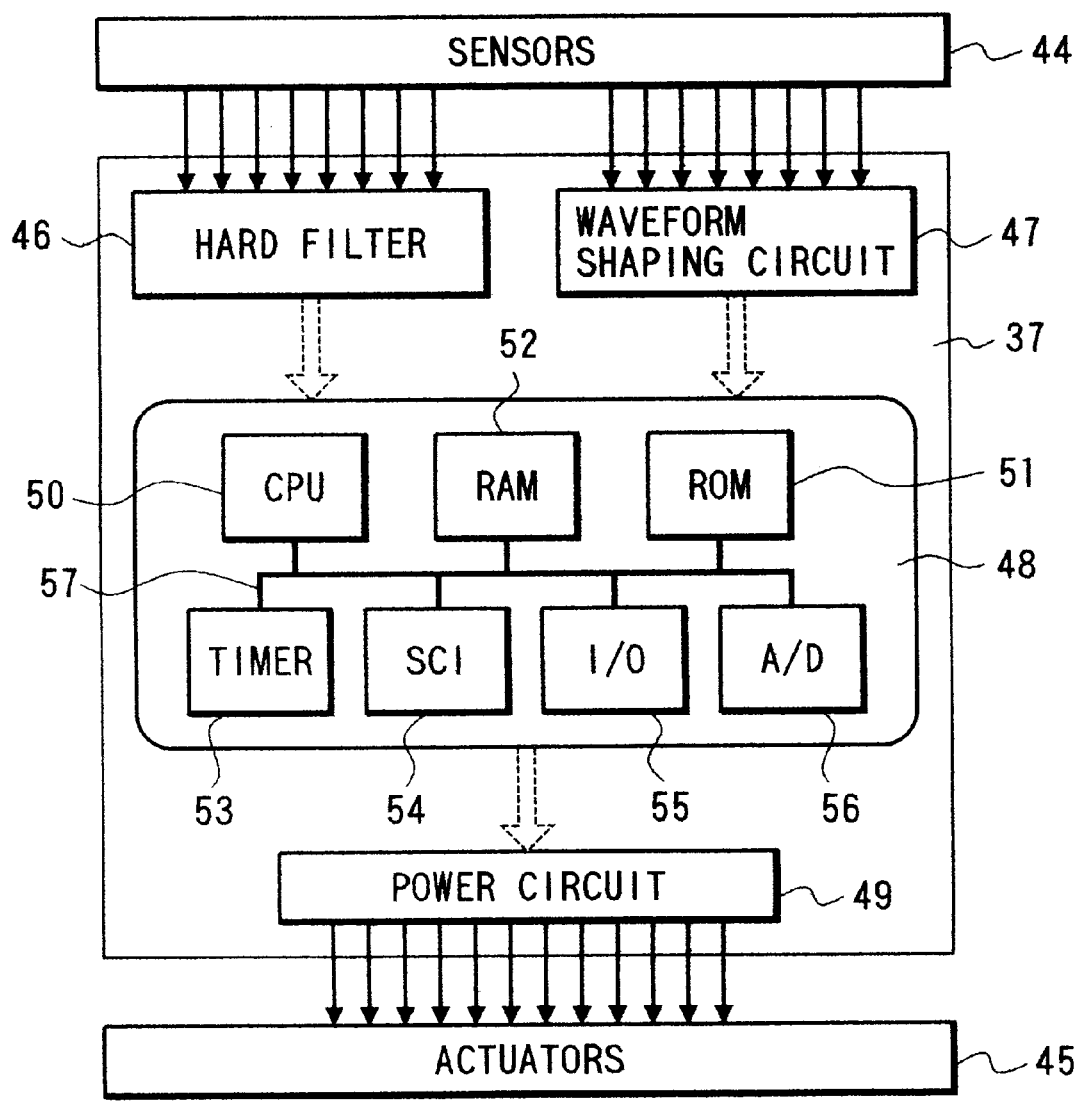
FIG. 2 is a schematic illustration of the configuration of a control unit in accordance with the present invention.

FIG. 2 shows a configuration of the control unit 37 composed of a hard filter 46 and a waveform shaping circuit 47 each for inputting signals from various sensors 44, a microcomputer 48, and a power circuit 49 for outputting drive control signals to various actuators 45. The microcomputer 48 is composed of a CPU (Central Processing Unit) 50 for performing various computations, a ROM (Read-Only Memory) 51 previously storing programs and data for the performance of computations by the CPU 50, a RAM (Random Access Memory) 52 for temporarily storing various data or the like upon computations, a timer 53, a SCI (Serial Communication Interface) circuit 54, an I/O (Input-Output) circuit 55, an A/D (Analog to Digital) converter 56, and a data bus 57 for connecting these components together to transfer data.

Figure 3:
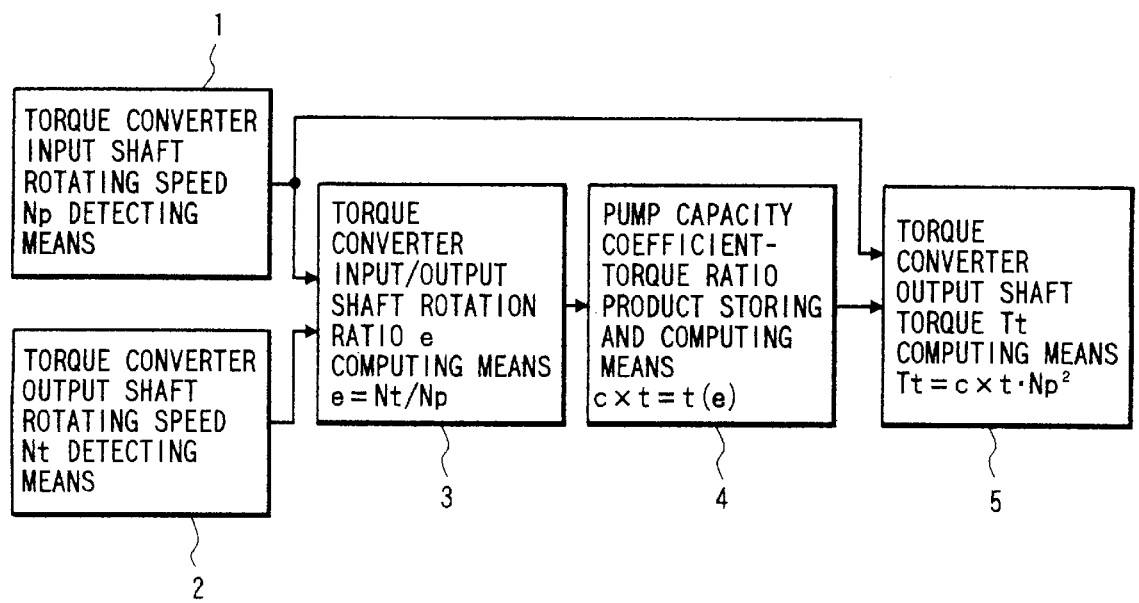
FIG. 3 is a block diagram showing an essential part of computations to be performed by the control unit in accordance with the present invention.

FIG. 3 is a block diagram of an essential part of the computations to be performed by the control unit 37 shown in FIG. 2. Torque converter input shaft rotating speed detecting device 1 detects a torque converter input shaft rotating speed Np, and torque converter output shaft rotating speed detecting device 2 detects a torque converter output shaft rotating speed Nt. The torque converter input shaft rotating speed Np may be obtained from a signal from the rotating speed sensor 23 for detecting a rotating speed of the engine, because the rotating speed Np is equal to the engine rotating speed. Further, the torque converter output shaft rotating speed Nt may be obtained by computation using a transmission output shaft rotating speed and a gear ratio of the automatic transmission 33. Torque converter input/output shaft rotation ratio computing device 3 computes a torque converter input/output shaft rotation ratio, i.e., a speed ratio e, by using the torque converter input shaft rotating speed Np and the torque converter output shaft rotating speed Nt. Pump capacity coefficient and torque ratio product storing and computing device 4 stores in the form of functional expression or data table in the ROM data of pump capacity coefficient and torque ratio product, c×t, expressed by a function f of the speed ratio e, preliminarily obtained by multiplying a pump capacity coefficient c and a torque ratio t which are both functions of the speed ratio e, and then obtains a value of the pump capacity coefficient and torque ratio product, c×t, corresponding to a value of the speed ratio e computed above, by computation or interpolation. In the case of the computation, the functional expression of the pump capacity coefficient and torque ratio product, c×t, in relation to the speed ratio e is preliminarily stored in the ROM, and the value of the pump capacity coefficient and torque ratio product, c×t, corresponding to the computed value of the speed ratio e is computed. In the interpolation, two values of the pump capacity coefficient and torque ratio product, c×t, corresponding to two nearest values across the computed value of the speed ratio e are obtained from the data table, and interpolation between the two values of the product, c×t, is made to obtain the value of the product, c×t, corresponding to the computed value of the speed ratio e. Torque converter output shaft torque computing device 5 computes a torque converter output shaft torque Tt from Eq. (1) shown below by using the computed value of the pump capacity coefficient and torque ratio product, c×t, and the detected value of the torque converter input shaft rotating speed Np.

$$Tt = c \times t \cdot Np^2 \quad \ldots (1)$$

Figure 4:
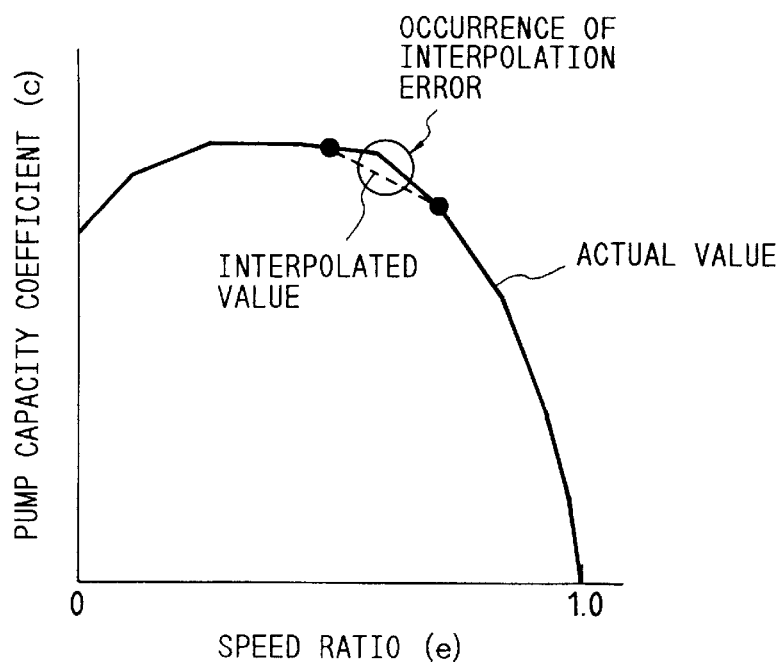
FIG. 4 is a graph showing a characteristic of a pump capacity coefficient c.
Figure 5:
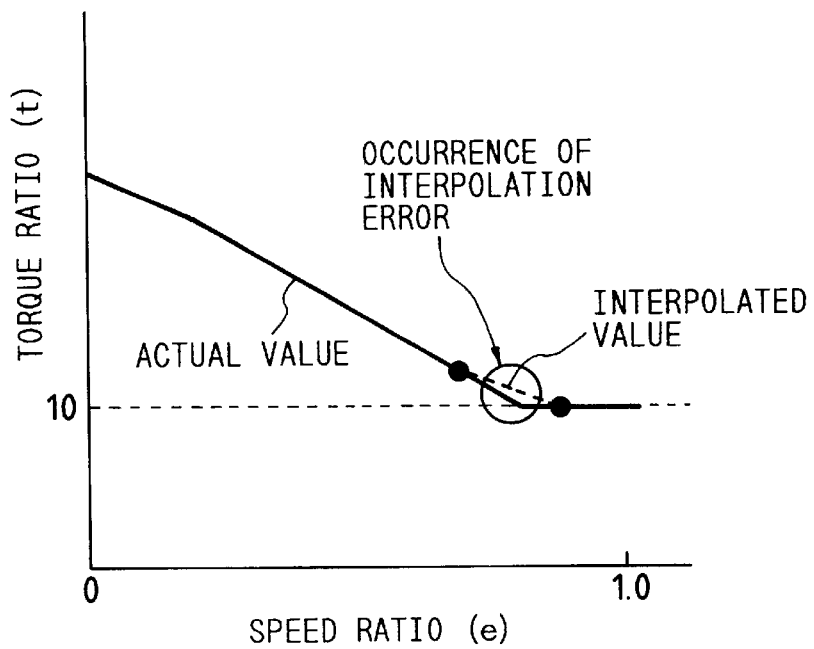
FIG. 5 is a graph showing a characteristic of a torque ratio
Figure 6:
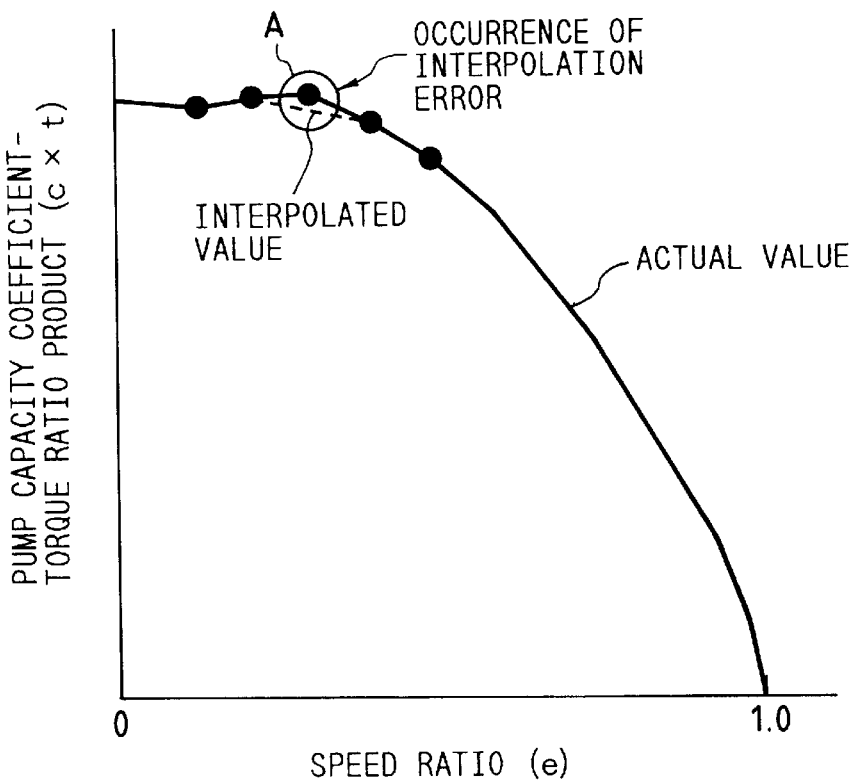
FIG. 6 is a graph showing a characteristic of a pump capacity coefficient and torque ratio product c×t.

FIG. 4 shows a characteristic of the pump capacity coefficient c of the torque converter, and FIG. 5 shows a characteristic of the torque ratio t of the torque converter. In the conventional method, the pump capacity coefficient c and the torque ratio t are separately stored in the form of data table in the ROM, and these two characteristics are separately retrieved to estimate the torque converter output shaft torque Tt. Accordingly, the capacity of the ROM must be enlarged. Further, because the capacity of the ROM is limited, data must be stored as discrete values spaced from each other, so that interpolation between these discrete values is necessary. In interpolating the data of each of the pump capacity coefficient c and the torque ratio t, an error occurs between an actual value and an interpolated value as shown in FIGS. 4 and 5. The multiplication of the interpolated values of the pump capacity coefficient c and the torque ratio t to obtain the pump capacity coefficient and torque ratio product, c×t, causes an increase in the error. According to this preferred embodiment of the present invention, however, the data of the pump capacity coefficient and torque ratio product, c×t, are stored in the form of data table in the ROM as shown in FIG. 6. Accordingly, the data amount required to be stored can be reduced to half, so that the capacity of the ROM can be correspondingly reduced to half. Further, since the errors due to interpolation are not multiplied together, an increase in the error can be avoided. Therefore, torque estimation with higher accuracy over the prior art can be made. Further, as shown in FIG. 6, actual values of the pump capacity coefficient and torque ratio product, c×t, include a maximum value at a point A. Therefore, a value of the pump capacity coefficient and torque ratio product, c×t, corresponding to a value of the speed ratio e at the point A is necessarily stored as one of the data in the ROM, and the other values are stored on the basis of the value at the point A, thereby reducing an interpolation error near the point A. Although the interpolation error is large near the peak of data in general, the interpolation error can be reduced by necessarily retaining the data at the peak point according to this preferred embodiment.

Figure 7:
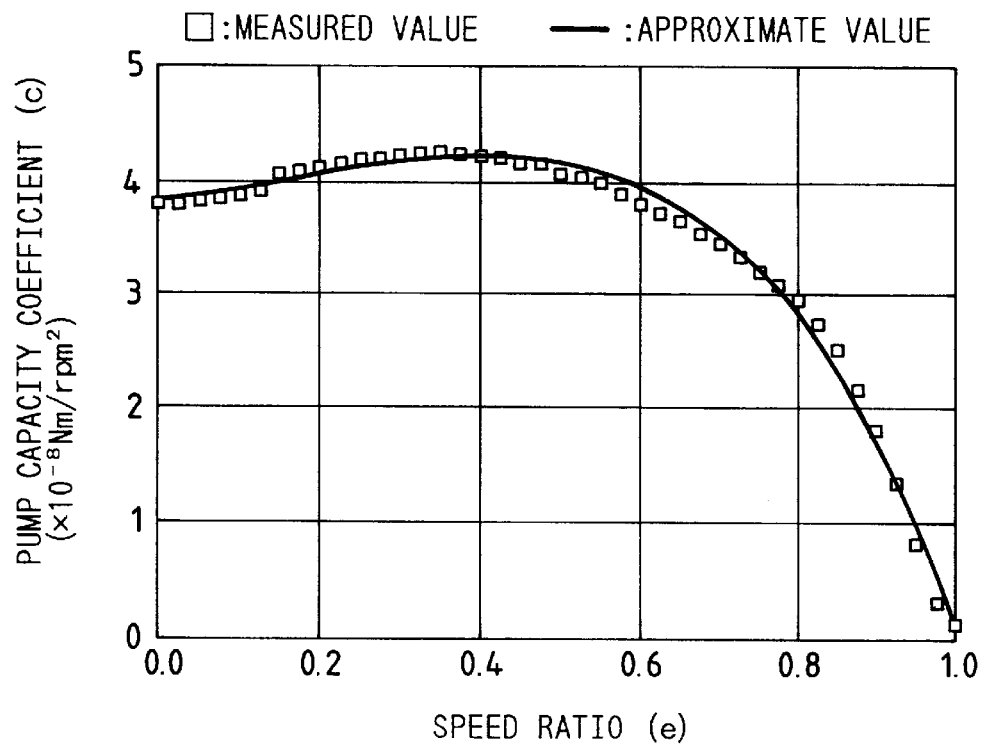
FIG. 7 is a graph showing the comparison between measured values and approximate values in the characteristic of the pump capacity coefficient c.
Figure 8:
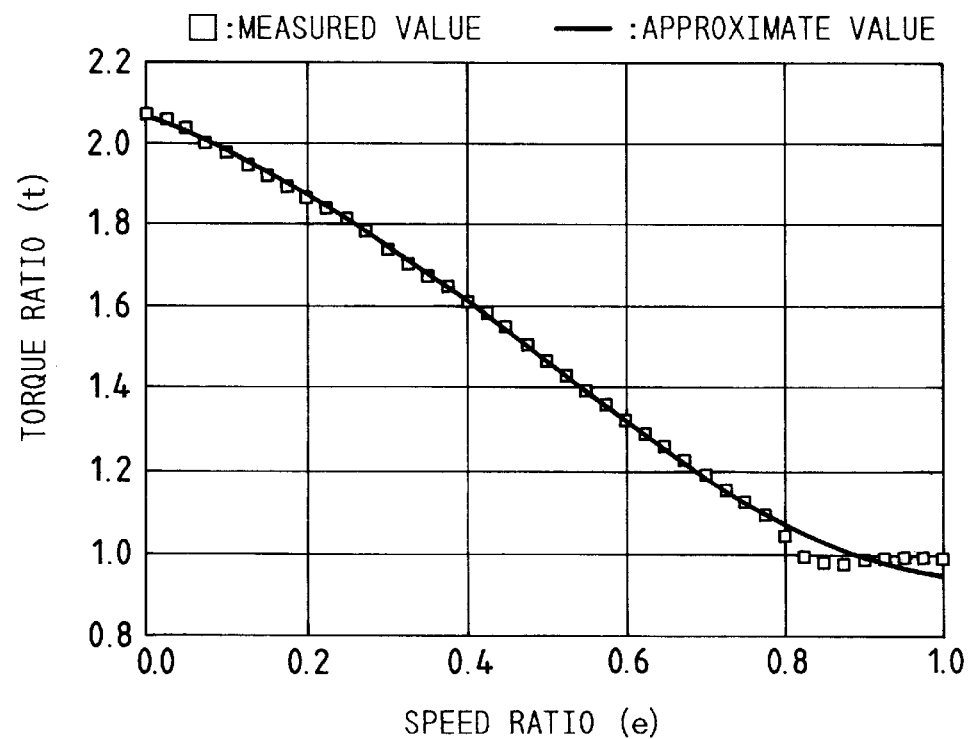
FIG. 8 is a graph showing the comparison between measured values and approximate values in the characteristic of the torque ratio t.
Figure 9:
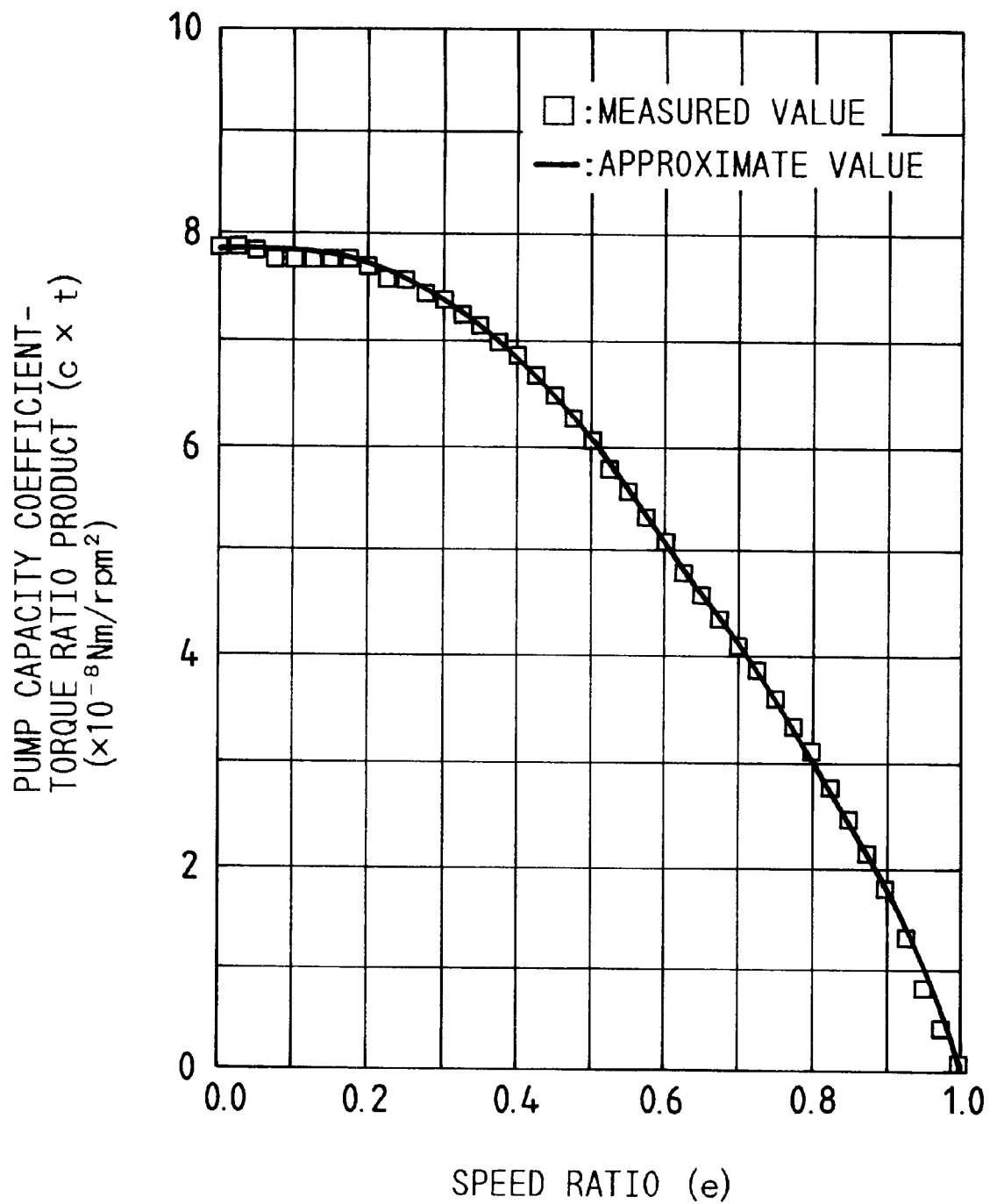
FIG. 9 is a graph showing an example of a comparison between measured values and approximate values in the characteristic of the pump capacity coefficient and torque product c×t.
Figure 10:
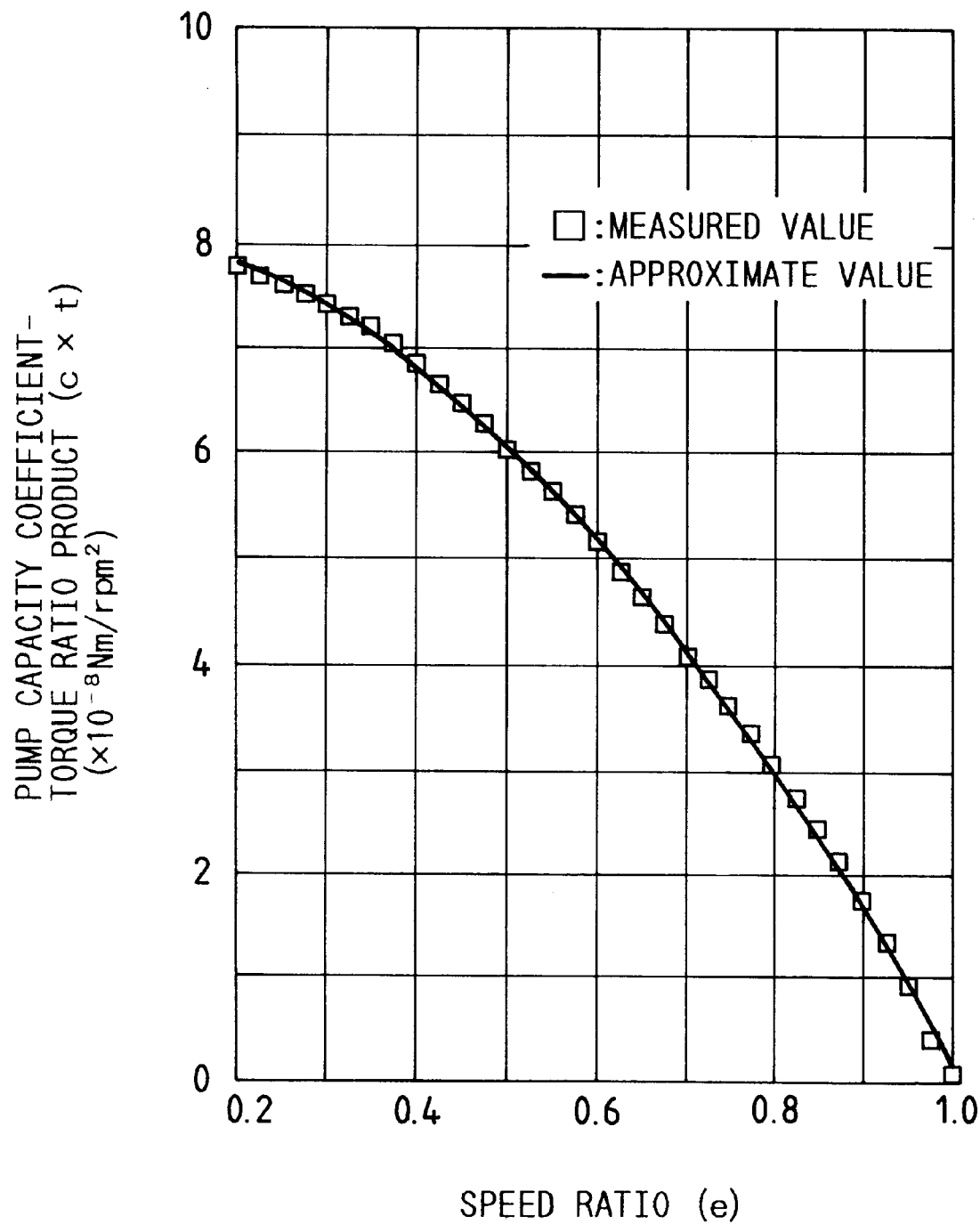
FIG. 10 is a graph similar to FIG. 9, showing another example.

FIGS. 7 to 10 show the comparisons between measured values and approximate values on the torque converter characteristics. The approximate values are plotted by preparing functional expressions of polynomials on the basis of the measured values. FIG. 7 shows the comparison on the pump capacity coefficient c, FIG. 8 shows the comparison on the torque ratio t, and FIG. 9 shows the comparison on the pump capacity coefficient and torque ratio product, c×t. In each comparison, a third-order expression is used as the approximate expression. FIG. 10 also shows the comparison on the pump capacity coefficient and torque ratio product, c×t, like FIG. 9; however, a second-order expression is used as the approximate expression, and a range of less than 0.2 for the speed ratio e is omitted in FIG. 10. In a range between 0.4 and 0.9 for the speed ratio e in FIG. 7 and a range between 0.8 and 0.9 for the speed ratio e in FIG. 8, there are large errors between the measured values and the approximate values even though the third-order expression is used as the approximate expression in each comparison. Accordingly, in the conventional method wherein the pump capacity coefficient c and the torque ratio t are separately computed, a large error occurs in computing the pump capacity coefficient and torque ratio product, c×t, and there is a greater possibility that a large error may occur in computing the torque converter output shaft torque Tt using the product, c×t, having the large error. To the contrary, according to the present invention, there are no large errors between the measured values and the approximate values of the pump capacity coefficient and torque ratio product, c×t, as shown in FIG. 9, so that there is almost no possibility that an error may occurs in computing the torque converter output shaft torque Tt using the product, c×t, having no large errors. In this manner, according to the present invention, both the reduction in ROM capacity and the torque estimation with high accuracy can be realized. Further, in actual computation, there is no possibility that a region corresponding to the range of less than 0.2 for the speed ratio e except for e=O, and this region is replaced by a value corresponding to e=0. Therefore, it is sufficient to approximate only the other region corresponding to the range of not less than 0.2 for the speed ratio e as shown in FIG. 10. Even though the second-order expression is used as the approximate expression, there are almost no errors between the measured values and the approximate values as shown in FIG. 10, so that torque estimation with sufficiently high accuracy can be realized even by the second-order expression. However, a value of the pump capacity coefficient and torque ratio product, c×t, corresponding to e=O is preliminarily stored in the ROM independently of the second-order expression. Further, when a microcomputer having high computing power is used for the computation, a higher-order expression such as a fourth-order or fifth-order expression can be used to thereby further reduce the error and realize torque estimation with higher accuracy. With a high performance of a microcomputer for an automobile, higher-order multiplying/adding operations are obtainable, so that application of a higher-order approximate expression is effective for a reduction in ROM capacity. Further, a cost reduction of the control unit is also achieved.

With the above configuration, torque estimation with high accuracy is performed, thereby allowing torque control with high accuracy. Further, by using a transmission output shaft torque computed by using the torque converter output shaft torque Tt computed with high accuracy and a gear ratio, various computations for clutch engagement oil pressure control in the transmission, drive shaft torque control including a reduction in shift shock, road surface gradient estimation, etc. can be performed with high accuracy.

According to the present invention, data amounts of torque converter characteristics used for torque estimation can be reduced, and torque estimation with high accuracy can be realized. Therefore, engine powertrain control can be realized at a low cost with high accuracy.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An engine powertrain control device for a vehicle having an engine powertrain which includes an engine and an automatic transmission having a torque converter and a gear shifting mechanism, comprising:

a pump capacity coefficient and torque ratio product storing device for storing in a single map the previously calculated product of a pump capacity coefficient and torque ratio obtained by multiplying values of a pump capacity coefficient and a torque ratio, together representing characteristics of said torque converter ; and a torque converter output shaft torque computing device for computing an output shaft torque of said torque converter by using said value of said pump capacity coefficient and torque ratio product from the single map stored in said pump capacity coefficient and torque ratio product storing device.

2. An engine powertrain control device for a vehicle having an engine powertrain which includes an engine and an automatic transmission having a torque converter and a gear shifting mechanism, comprising:

a torque converter input/output shaft rotating speed detecting device for detecting an input shaft rotating speed and an output shaft rotating speed of said torque converter;

a torque converter input/output shaft rotation ratio computing device for computing a speed ratio as a ratio between said input shaft rotating speed and said output shaft rotating speed of said torque converter detected by said torque converter input/output shaft rotating speed detecting device;

a pump capacity coefficient and torque ratio product storing device for storing in a single map the Previously calculated product of a pump capacity coefficient and torque ratio product obtained by multiplying values of a pump capacity coefficient and a torque ratio, together representing characteristics of said torque converter, and for computing a value of said product stored corresponding to a value of said speed ratio computed by said torque converter input/output shaft rotation ratio computing device; and a torque converter output shaft torque computing device for computing an output shaft torque of said torque converter by using said value of said pump capacity coefficient and torque ratio product from the single map stored in said pump capacity coefficient and torque ratio product storing device.

3. An engine powertrain control device according to claim 2, wherein a memory comprises a data table for storing said data and a retrieving device for retrieving said data from said data table.

4. An engine powertrain control device according to claim 3, wherein said data stored in said data table includes at least one of a maximum value and a minimum value of said pump capacity coefficient and torque ratio product.

5. An engine powertrain control device according to claim 2, wherein said data stored in said pump capacity coefficient and torque ratio product storing device is a functional expression in a range of not less than 0.2 for said speed ratio, and is a constant value in a range of less than 0.2 for said speed ratio.

6. An engine powertrain control device according to claim 2, wherein said data stored in said pump capacity coefficient and torque ratio product storing device is a functional expression using said speed ratio as a variable.

7. An engine powertrain control device according to claim 6, wherein said functional expression is a functional expression whose order ranges from two to five, using said speed ratio as a variable.

8. An engine powertrain control device according to claim 2, further comprising a control device using said torque converter output shaft torque computed by said torque converter output shaft torque computing device for at least one of computations for clutch engagement oil pressure control in said gear shifting mechanism, drive torque control, and road surface gradient estimation.

9. An engine powertrain control method for a vehicle having an engine powertrain which includes an engine and an automatic transmission having a torque converter and a gear shifting mechanism, comprising the steps of:

storing a previously calculated pump capacity coefficient and torque ratio product obtained by multiplying a pump capacity coefficient and a torque ratio representative of torque converter characteristics in a single map;

obtaining from the single map a value of said pump capacity coefficient and torque ratio product from said stored data; and computing an output shaft torque of said torque converter by using said detected value of said pump capacity coefficient and torque ratio product.

10. An engine powertrain control method for a vehicle having an engine powertrain including an engine and an automatic transmission having a torque converter and a gear shifting mechanism, comprising the steps of:

storing a previously calculated pump capacity coefficient and torque ratio product obtained by multiplying a pump capacity coefficient and a torque ratio representative of torque converter characteristics in a single map;

obtaining an input shaft rotating speed and an output shaft rotating speed of said torque converter;

computing a speed ratio as a ratio between said input shaft rotating speed and said output shaft rotating speed of said torque converter;

obtaining from the single map a value of said pump capacity coefficient and torque ratio product corresponding to a value of said computed speed ratio; and computing an output shaft torque of said torque converter by using said value of said pump capacity coefficient and obtained torque ratio product.

11. An engine powertrain control method according to claim 10, wherein said storing step stores data of said pump capacity coefficient and torque ratio product in a data table in the single map.

12. An engine powertrain control method according to claim 11, wherein said data table includes at least one of a maximum value and a minimum value of said pump capacity coefficient and torque ratio product.

13. An engine powertrain control method according to claim 10, wherein said storing step stores data of said pump capacity coefficient and torque ratio product in the single map in a functional expression in a range of not less than 0.2 for said speed ratio, and as a constant value in a range of less than 0.2 for said speed ratio.

14. An engine powertrain control method according to claim 10, wherein said storing step stores data of said pump capacity coefficient and torque ratio product in the single map in a functional expression using said speed ratio as a variable.

15. An engine powertrain control method according to claim 14, wherein said functional expression is a functional expression whose order ranges from two to five, using said speed ratio as a variable.

16. An engine powertrain control method according to claim 10, further comprising the step of using said torque converter output shaft torque computed for at least one of computations for clutch engagement oil pressure control in said gear shifting mechanism, drive torque control, and road surface gradient estimation.

* * * * *